(12) United States Patent
Terasaka et al.

(10) Patent No.: US 11,448,535 B2
(45) Date of Patent: Sep. 20, 2022

(54) FLOW RATE CALCULATION SYSTEM, FLOW RATE CALCULATION SYSTEM PROGRAM, FLOW RATE CALCULATION METHOD, AND FLOW RATE CALCULATION DEVICE

(71) Applicant: HORIBA STEC, Co., Ltd., Kyoto (JP)

(72) Inventors: Masanori Terasaka, Kyoto (JP); Koji Imamura, Kyoto (JP); Osamu Horinouchi, Kyoto (JP); Yasuhiro Isobe, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 380 days.

(21) Appl. No.: 16/800,670

(22) Filed: Feb. 25, 2020

(65) Prior Publication Data

US 2020/0278226 A1 Sep. 3, 2020

(30) Foreign Application Priority Data

Feb. 28, 2019 (JP) .............................. JP2019-036220

(51) Int. Cl.
*G01F 1/50* (2006.01)
*G05D 7/06* (2006.01)
(Continued)

(52) U.S. Cl.
CPC ............... *G01F 1/50* (2013.01); *G01F 1/363* (2013.01); *G01F 1/696* (2013.01); *G01K 13/02* (2013.01); *G05D 7/0623* (2013.01); *G01F 25/10* (2022.01)

(58) Field of Classification Search
CPC .... G05D 7/0623; G05D 16/2022; F15B 9/09; F15B 2211/6306; F15B 2211/6653;
(Continued)

(56) References Cited

U.S. PATENT DOCUMENTS 5,004,538 A * 4/1991 Apfel ..................... G01N 30/32
210/101
5,201,581 A * 4/1993 Vander Heyden ... G01N 33/225
73/863.61

(Continued)

FOREIGN PATENT DOCUMENTS

JP H11087318 A 3/1999

*Primary Examiner* — William M McCalister
(74) *Attorney, Agent, or Firm* — Alleman Hall Creasman & Tuttle LLP

(57) ABSTRACT

In order to accurately calculate an estimated flow rate by a dynamic constant volume method, a flow rate calculation system including a tank into which fluid flows, an inflow line through which the fluid flows into the tank, and a pressure sensor that detects the pressure inside the tank is adapted to include: a pressure change data storage part that stores pressure change data indicating a temporal change in the pressure detected by the pressure sensor during an inflow period; a flow rate calculation part that calculates the estimated flow rate during the inflow period based on a pressure change rate; and a flow rate correction part that, on the basis of first pressure detected by the pressure sensor after a predetermined time has elapsed after the inflow period and second pressure included in the pressure change data and higher than the first pressure, corrects the estimated flow rate.

12 Claims, 5 Drawing Sheets

(51) Int. Cl.
*G01F 1/696* (2006.01)
*G01F 1/36* (2006.01)
*G01K 13/02* (2021.01)
*G01F 25/10* (2022.01)

(58) Field of Classification Search
CPC .. F15B 2211/7053; G01F 1/363; G01F 25/10; G01F 13/02; Y10T 137/7759; Y10T 137/7761; G01K 13/02
USPC .............................................. 137/486, 487.5
See application file for complete search history.

(56) References Cited

U.S. PATENT DOCUMENTS

| | | | |
|---|---|---|---|
| 5,488,967 A * | 2/1996 | Minami | C23C 16/455 137/601.13 |
| 5,744,695 A * | 4/1998 | Forbes | G01F 25/13 73/1.35 |
| 5,865,205 A * | 2/1999 | Wilmer | G05D 7/0635 73/1.16 |
| 6,119,710 A * | 9/2000 | Brown | G01F 1/88 137/486 |
| 6,363,958 B1 * | 4/2002 | Ollivier | G05D 16/0661 137/486 |
| 7,979,165 B2 * | 7/2011 | Gotoh | G01F 15/043 700/282 |
| 8,240,324 B2 * | 8/2012 | Monkowski | G01F 25/17 137/12 |
| 8,762,030 B2 * | 6/2014 | Saruwatari | F02M 37/20 73/114.43 |
| 10,679,880 B2 * | 6/2020 | Penley | B05B 12/087 |
| 2003/0183279 A1 * | 10/2003 | Chang | G05D 7/0647 137/487.5 |
| 2004/0079341 A1 * | 4/2004 | Fuwa | F02D 41/18 73/114.34 |
| 2005/0044929 A1 * | 3/2005 | Gysling | G01F 1/8477 73/32 A |
| 2009/0019943 A1 * | 1/2009 | Ozawa | G01F 15/005 73/861 |
| 2009/0165534 A1 * | 7/2009 | Kohno | G01M 3/2815 73/49.1 |
| 2016/0282880 A1 * | 9/2016 | Nagase | G01F 1/50 |
| 2018/0246533 A1 * | 8/2018 | Somani | G01F 15/005 |

* cited by examiner

FLOW RATE CALCULATION SYSTEM, FLOW RATE CALCULATION SYSTEM PROGRAM, FLOW RATE CALCULATION METHOD, AND FLOW RATE CALCULATION DEVICE

TECHNICAL FIELD

The present invention relates to a flow rate calculation system, a flow rate calculation system program, a flow rate calculation method, and a flow rate calculation device.

BACKGROUND ART

In a fluid supply system that supplies material gas (hereinafter also referred to as fluid) to a chamber of a deposition apparatus in a semiconductor process or the like, it is necessary to accurately control the flow rate of the fluid to be supplied to the chamber, and therefore a flow rate control device is provided in a flow path through which the fluid flows. In addition, the flow rate control device is a so-called mass flow controller, and configured to include a flow rate sensor for detecting the flow rate of the fluid flowing through the flow path and perform feedback control so that the flow rate detected by the flow rate sensor comes close to a set flow rate.

However, the flow rate control device may fail to control the flow rate in accordance with the set flow rate because of aged deterioration and the like such as the clogging of the flow path. For this reason, it is necessary to regularly inspect whether or not the flow rate control device can control a flow rate in accordance with a set flow rate.

For this reason, conventional fluid supply systems include one that incorporates a flow rate calculation system for inspecting a flow rate control device. For example, Patent Literature 1 discloses a flow rate calculation system configured to, separately from a fluid supply flow path for supplying fluid flowing through a flow rate control device to a chamber, provide a fluid inspection flow path for inspecting the flow rate control device, and install a tank in the middle of the fluid inspection flow path.

The flow rate calculation system is configured to use the tank and calculate the estimated flow rate of the fluid estimated to flow through the flow rate control device by a dynamic constant volume method (the rate of rise in pressure (ROR) method) for the inspection. Specifically, the flow rate calculation system allows the fluid flowing through the flow rate control device to flow into the tank in a vacuum state for a predetermined period, and on the basis of the resulting rate of change ($\Delta P/\Delta t$) in the pressure inside the tank, calculates the estimated flow rate of the fluid estimated to flow through the flow rate control device during the predetermined period. Then, by comparing the estimated flow rate and a set flow rate, it is inspected whether or not the flow rate of the fluid flowing through the flow rate control device is equal to the set flow rate.

Specifically, the estimated flow rate Q is calculated by Expression 1 below.

[Expression 1]

$$Q = \frac{\Delta P}{\Delta t} \times \frac{22.4V}{RT} \qquad 1$$

In addition, in Expression 1 above, $\Delta P/\Delta t$ represents the rate of change in the pressure inside the tank per unit time, V represents the volume of the tank, T represents the temperature of the tank (specifically, the temperature of the internal space of the tank or the wall temperature of the tank itself), and R represents the gas constant.

Meanwhile, while conducting research and development in order to further improve the flow rate calculation system, the Applicant has found that the estimated flow rate calculated by Expression 1 above has an error with respect to the actual flow rate of the fluid actually flowing through the flow rate control device because of the following phenomenon. Describing in detail, in the process of flowing the fluid flowing through the flow rate control device into the tank, adiabatic compression occurs in the tank to raise the temperature of the fluid. This causes the rate of change in pressure used when calculating the estimated flow rate using Expression 1 above to take a value affected by the temperature rise of the fluid in the tank. As a result, the Applicant has found that when calculating the estimated flow rate using Expression 1 above, an error occurs with respect to the actual flow rate.

CITATION LIST

Patent Literatures

Patent Literature 1: Japanese Unexamined Patent Application Publication No. 11-87318

SUMMARY OF INVENTION

Technical Problem

Therefore, the main object of the present invention is to obtain a flow rate calculation system capable of accurately calculating an estimated flow rate by a dynamic constant volume method.

Solution to Problem

That is, the flow rate calculation system according to the present invention is a flow rate calculation system including a tank into which fluid flows, an inflow line through which the fluid flows into the tank, and a pressure sensor that detects the pressure inside the tank, and the flow rate calculation system includes: a pressure change data storage part that stores pressure change data indicating a temporal change in the pressure detected by the pressure sensor during an inflow period from start flowing the fluid into the tank through the inflow line to stop flowing the fluid into the tank; a flow rate calculation part that, on the basis of a pressure change rate calculated from the pressure change data, calculates the estimated flow rate of the fluid estimated to flow through the inflow line during the inflow period; and a flow rate correction part that, on the basis of first pressure detected by the pressure sensor after a predetermined time has elapsed since stop flowing the fluid into the tank and second pressure included in the pressure change data and higher than the first pressure, corrects the estimated flow rate calculated by the flow rate calculation part.

In such a configuration, the flow rate calculated on the basis of the pressure change rate inside the tank during the inflow period is configured to be corrected on the basis of the first pressure detected by the pressure sensor after the predetermined time has elapsed since stop flowing the fluid into the tank and the second pressure included in the pressure change data and higher than the first pressure, and therefore an error with respect to an actual flow rate, which occurs when calculating the estimate flow rate of the fluid estimated to flow through the inflow line during the inflow period, can be suppressed. As a result, the flow rate calculation system enables a more accurate estimated flow rate, or in other words, an estimated flow rate close to the actual flow rate to be calculated.

Specifically, the Applicant has found that while continuing the research and development of a flow rate calculation system using a dynamic constant volume method, in a graph (see FIG. 4) showing a temporal change in pressure with the vertical axis representing the pressure P inside a tank and the horizontal axis representing time t, the pressure P reduces until a certain level of time elapses since a time point of stop flowing fluid into the tank and then comes into a stable state (hereinafter the pressure in this state is also referred to as stable pressure. In addition, to be accurate, the stable pressure indicates a state where a sharp reduction (fall) in pressure is suppressed, and indicates a state where the pressure continues to slightly reduce.). This is thought to be a phenomenon caused by a temperature rise associated with adiabatic compression occurring in the tank during an inflow period. The Applicant has found that, for this reason, when attempting to calculate the estimated flow rate using the pressure change data indicating the temporal change in pressure detected by the pressure sensor during the inflow period, the estimated flow rate is calculated on the basis of pressure affected by a temperature rise associated with adiabatic compression occurring in the tank, and this causes an error with respect to the actual flow rate. Further, the Applicant has found that by correcting the estimated flow rate on the basis of the first pressure and the second pressure, the effect of the temperature rise associated with the adiabatic compression on the estimated flow rate can be suppressed, and reached completion of the present invention.

Incidentally, in the case of the flow rate calculation system using the dynamic constant volume method that on the basis of the pressure change rate inside the tank during the inflow period, calculates the estimated flow rate of the fluid estimated to flow through the inflow line during the inflow period as in the present invention, as compared with a flow rate calculation system using a static constant volume method, the effect of a peak formed by the maximum pressure and the stable pressure among pressures inside the tank during the inflow period on the flow rate notably appears. For this reason, the effect of the correction based on the first pressure and the second pressure also notably appears.

In addition, it is preferable that the second pressure is the maximum pressure included in the pressure change data or pressure close to the maximum pressure.

In such a configuration, an error included in the estimated flow rate calculated by the flow rate calculation part and due to the temperature rise inside the tank can be significantly suppressed.

In addition, specifically, the flow rate correction part corrects the estimated flow rate on the basis of a correction factor that is the ratio of the first pressure to the second pressure.

Also, the flow rate calculation system may be one further including a temperature sensor that detects the temperature inside or of the tank, in which the flow rate calculation part calculates the estimated flow rate on the basis of the pressure change rate and temperature detected by the temperature sensor during the inflow period. Specifically, the flow rate calculation system may be one further including: a temperature storage part that stores temperature change data indicating a temporal change in the temperature detected by the temperature sensor during the inflow period; and an average temperature calculation part that, from the temperature change data, calculates the average temperature of the tank during the inflow period, in which the flow rate calculation part calculates the estimated flow rate on the basis of the pressure change rate and the average temperature.

As the tank, for example, one having a volume of 100 ml to 200 l is used. In addition, as the volume of the tank is increased, larger temperature deviation occurs in the tank, making it impossible for the temperature sensor to detect accurate temperature of the tank. For this reason, using the average temperature of the tank during the inflow period when the flow rate calculation part calculates the estimated flow rate enables an estimated flow rate having a smaller error to be calculated. Here, the temperature inside or of the tank refers to, for example, the temperature of the internal space of the tank or the wall temperature of the tank.

In addition, the temperature sensor may be one that detects the wall temperature of the tank.

Also, the flow rate calculation system may be one further including a flow rate control device that controls the flow rate of the fluid flowing through the inflow line, in which the flow rate calculation part calculates the estimated flow rate of the fluid estimated to flow through the flow rate control device during the inflow period.

In addition, the flow rate calculation system may be one further including: a branch line that branches from the inflow line; and a switching mechanism that switches between a first state allowing the fluid to flow only to the branch line and a second state allowing the fluid to flow only to the downstream side of a branching point to the branch line in the inflow line, in which the flow rate control device is one that is provided on the upstream side of the branching point to the branch line in the inflow line.

In such a configuration, after evacuating the tank before the inflow period, the fluid can be flowed to the flow rate control device through the branch line while keeping the inside of the tank in the vacuum state. In doing so, by start flowing the fluid into the tank through the inflow line and also making the switching mechanism switch from the first state to the second state, the fluid having a stable flow rate can be immediately flowed into the tank from the flow rate control device.

Also, the flow rate calculation system program according to the present invention is a program used for a flow rate calculation system including a tank into which fluid flows, an inflow line through which the fluid flows into the tank, and a pressure sensor that detects the pressure inside the tank, and the flow rate calculation system program fulfills functions as: a pressure change data storage part that stores pressure change data indicating a temporal change in the pressure detected by the pressure sensor during an inflow period from start flowing the fluid into the tank through the inflow line to stop flowing the fluid into the tank; a flow rate calculation part that, on the basis of a pressure change rate calculated from the pressure change data, calculates the estimated flow rate of the fluid estimated to flow through the inflow line during the inflow period; and a flow rate correction part that, on the basis of first pressure detected by the pressure sensor after a predetermined time has elapsed since stop flowing the fluid into the tank and second pressure included in the pressure change data and higher than the first pressure, corrects the estimated flow rate calculated by the flow rate calculation part. In addition, the flow rate calculation system program may be one electronically distributed or recorded on a program recording medium such as a CD, DVD, BD, or flash memory.

Further, the flow rate calculation method according to the present invention is a method used for a flow rate calculation system including a tank into which fluid flows, an inflow line through which the fluid flows into the tank, and a pressure sensor that detects the pressure inside the tank, and the flow rate calculation method includes the steps of: storing pressure change data indicating a temporal change in the pressure detected by the pressure sensor during an inflow period from start flowing the fluid into the tank through the inflow line to stop flowing the fluid into the tank; on the basis of a pressure change rate calculated from the pressure change data, calculating the estimated flow rate of the fluid estimated to flow through the inflow line during the inflow period; and on the basis of first pressure detected by the pressure sensor after a predetermined time has elapsed since stop flowing the fluid into the tank and second pressure included in the pressure change data and higher than the first pressure, correcting the estimated flow rate calculated by the flow rate calculation part.

Still further, the flow rate calculation device according to the present invention is one used for a flow rate calculation system including a tank into which fluid flows, an inflow line through which the fluid flows into the tank, and a pressure sensor that detects the pressure inside the tank, and the flow rate calculation device includes: a pressure change data storage part that stores pressure change data indicating a temporal change in the pressure detected by the pressure sensor during an inflow period from start flowing the fluid into the tank through the inflow line to stop flowing the fluid into the tank; a flow rate calculation part that, on the basis of a pressure change rate calculated from the pressure change data, calculates the estimated flow rate of the fluid estimated to flow through the inflow line during the inflow period; and a flow rate correction part that, on the basis of first pressure detected by the pressure sensor after a predetermined time has elapsed since stop flowing the fluid into the tank and second pressure included in the pressure change data and higher than the first pressure, corrects the estimated flow rate calculated by the flow rate calculation part.

Yet further, the flow rate calculation system according to the present invention is a flow rate calculation system including a tank into which fluid flows, an inflow line through which the fluid flows into the tank, a pressure sensor that detects the pressure inside the tank, and a temperature sensor that detects the temperature inside or of the tank, and the flow rate calculation system includes: a pressure change data storage part that stores pressure change data indicating a temporal change in the pressure detected by the pressure sensor during an inflow period from start flowing the fluid into the tank through the inflow line to stop flowing the fluid into the tank; a temperature change data storage part that stores temperature change data indicating a temporal change in the temperature detected by the temperature sensor during the inflow period; a flow rate calculation part that, on the basis of a pressure change rate calculated from the pressure change data, calculates the estimated flow rate of the fluid estimated to flow through the inflow line during the inflow period; and a flow rate correction part that corrects the estimated flow rate on the basis of first temperature detected by the temperature sensor after a predetermined time has elapsed since closing a first on-off valve and second temperature included in the temperature change data and higher than the first temperature.

In such a configuration, the estimated flow rate calculated on the basis of the pressure change rate inside the tank during the inflow period is configured to be corrected on the basis of the first temperature detected by the temperature sensor after the predetermined time has elapsed since stop flowing the fluid into the tank and the second temperature included in the temperature change data and higher than the first temperature, and therefore an error with respect to an actual flow rate, which occurs when calculating the estimated flow rate of the fluid estimated to flow through the inflow line during the inflow period, can be suppressed. This enables the flow rate calculation system to calculate a more accurate estimated flow rate.

The flow rate calculation system configured as described is capable of accurately calculating an estimated flow rate by a dynamic constant volume method.

DESCRIPTION OF EMBODIMENTS

In the following, the flow rate calculation system according to the present invention will be described on the basis of the drawings.

The flow rate calculation system according to the present invention is one used to inspect/calibrate a flow rate control device incorporated in, for example, a semiconductor manufacturing line or the like.

Figure 1:
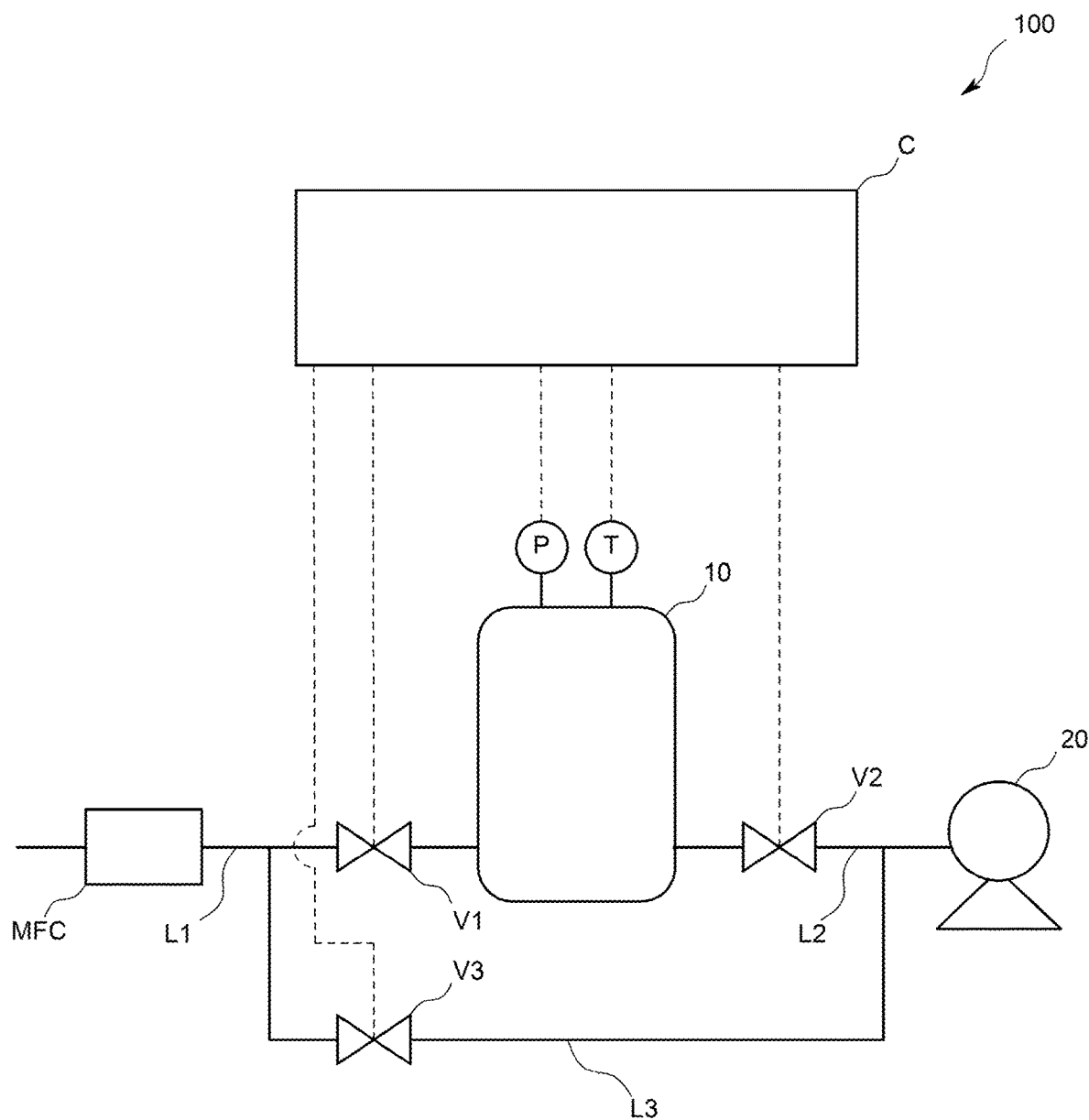
FIG. 1 is a schematic diagram illustrating a flow rate calculation system according to an embodiment.

As illustrated in FIG. 1, a flow rate calculation system 100 according to the present embodiment includes: a tank (container) 10 into which fluid flows; an inflow line L1 for flowing into the tank 10; an outflow line L2 through which the fluid flows out of the tank 10; a branch line L3 branching from the inflow line L1; and a flow rate calculation device C.

The tank 10 is provided with: a pressure sensor P for detecting the pressure inside the tank 10; and a temperature sensor T for detecting the wall temperature of the tank 10 (specifically, the temperature of the outer wall surface). In addition, the temperature sensor T may be one that detects the temperature of the internal space of the tank or the temperature of the inner wall surface of the tank.

The inflow line L1 is provided with a flow rate control device MFC for controlling the flow rate of the fluid flowing through the inflow line L1. The flow rate control device MFC is a mass flow controller including: a flow rate sensor of a thermal type, a pressure type, or another type; a flow rate regulation valve such as a piezo valve; and a control circuit including a CPU, a memory, and the like. In addition, the flow rate calculation system 100 in the present embodiment is one that inspects the flow rate control device MFC.

The outflow line L2 is provided with a pump 20 for discharging the fluid from the tank 10 to the downstream side.

The branch line L3 is such that the upstream end thereof is connected to the downstream side of the flow rate control device MFC in the inflow line L1 and the downstream end thereof is connected to the upstream side of the pump 20 in the outflow line L2. That is, the branch line L3 is connected to the inflow line L1 and to the outflow line L2 so as to bypass the tank 10.

Also, the inflow line L1, the outflow line L2, and the branch line L3 are respectively provided with on-off valves V1 to V3. Further, the flow rate calculation system 100 is configured to, by switching on/off of the respective on-off valves V1 to V3, sequentially switch to an exhaust mode where the tank 10 is evacuated, a preparation mode where the vacuum state inside the tank 10 is kept and a flow rate through the flow rate control device MFC is stabilized, an inflow mode where the fluid flows into the tank 10, and a stop mode where the inflow of the fluid into the tank 10 is stopped.

Specifically, the inflow line L1 is provided with the first on-off valve V1 on the downstream side of a branching point to the branch line L3. Also, the outflow line L2 is provided with the second on-off valve V2 on the upstream side of a merging point with the branch line L3. Further, the branch line L3 is provided with the third on-off valve V3 in the middle thereof. In addition, the first on-off valve V1 and the third on-off valve V3 serve as a switching mechanism that switches between a first state allowing the fluid flowing on the upstream side of the branching point to the branch line L3 in the inflow line L1 to be flowed only to the branch line L3 and a second state allowing the fluid to be flowed only to the downstream side of the branching point to the branch line L3 in the inflow line L1. That is, the first on-off valve V1 and the third on-off valve V3 serve as a switching mechanism that makes a switch so as to selectively flow the fluid flowing on the upstream side of the branching point to the branch line L3 in the inflow line L1 to the branch line L3 or to the downstream side of the branching point to the branch line L3 in the inflow line L1.

Further, when the respective on-off valves V1 to V3 receive switching signals for the exhaust mode, the first on-off valve V1 is closed, the second on-off valve V2 is opened, and the third on-off valve V3 is closed. This allows the tank 10 to be evacuated by the pump 20 provided in the outflow line L2. In addition, the first on-off valve V1 and the third on-off valve V3 prevent the fluid flowing through the inflow line L1 from flowing to the downstream side of the tank 10. As a result, the pump 20 is not connected to the flow rate control device MFC but brought into a state of being connected only to the tank 10, and therefore the tank 10 is sufficiently evacuated.

Then, when the respective on-off valves V1 to V3 receive switching signals for the preparation mode, the first on-off valve V1 is closed, the second on-off valve V2 is closed, and the third on-off valve V3 is opened. This allows the tank 10 to be sealed by the first on-off valve V1 and the second on-off valve V2 and kept in the vacuum state. In addition, the fluid flowing through the inflow line L1 flows to the downstream side of the tank through the branch line L3. As a result, the flow rate control device MFC returns from a state where the flow rate is not stable because of the exhaust mode to a state where the flow rate is stable.

Subsequently, when the respective on-off valves V1 to V3 receive switching signals for the inflow mode, the first on-off valve V1 is opened, the second on-off valve V2 is closed, and the third on-off valve V3 is closed. This allows the fluid flowing through the inflow line L1, in other words, the fluid flowing through the flow rate control device MFC to entirely flow into the tank 10.

After that, when the respective on-off valves V1 to V3 receive switching signals for the stop mode, the first on-off valve V1 is closed, the second on-off valve V2 is closed, and the third on-off valve V3 is opened. This allows the tank 10 to be kept in a state of being sealed by the first on-off valve V1 and the second on-off valve V2. In addition, the fluid flowing through the inflow line L1 again starts flowing to the downstream side of the tank 10 through the branch line L3.

Figure 2:
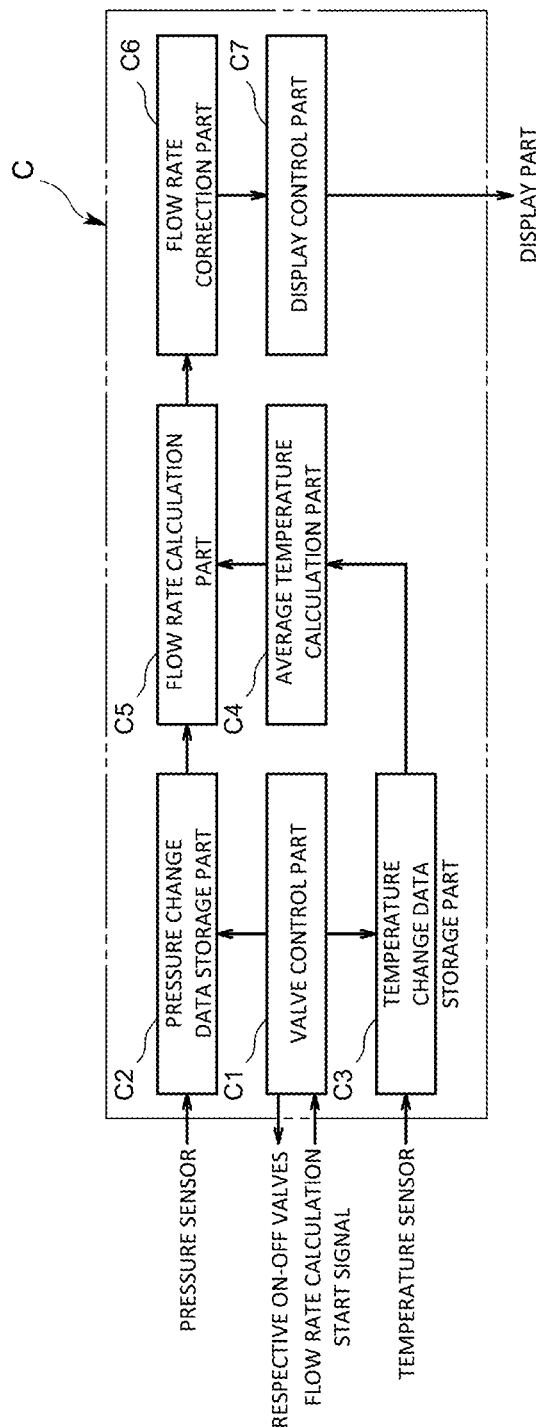
FIG. 2 is a block diagram illustrating the functions of the flow rate calculation system according to the embodiment.
Figure 3:
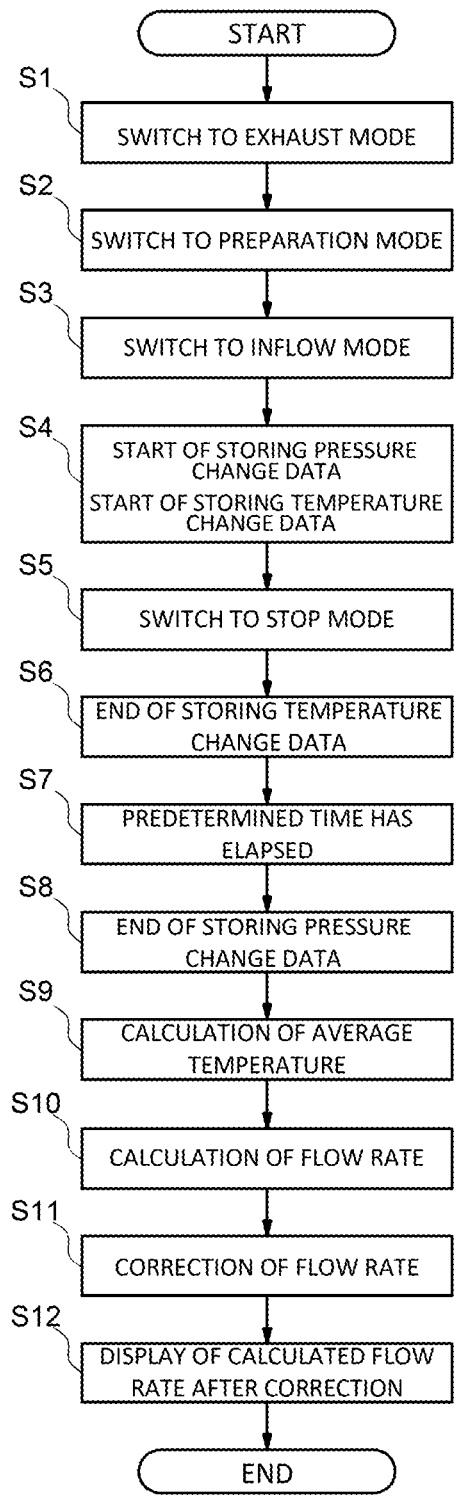
FIG. 3 is a flowchart illustrating the operation of the flow rate calculation system according to the embodiment.

The flow rate calculation device C is connected to the respective on-off valves V1 to V3, the pressure sensor P, the temperature sensor T, the flow rate control device MFC, and an unillustrated display part. Further, the flow rate calculation device C is specifically a computer having a CPU, a memory, an AD converter, a DC converter, input means, and the like, and as illustrated in FIG. 2, configured to fulfill functions as a valve control part C1, a pressure change data storage part C2, a temperature change data storage part C3, an average temperature calculation part C4, a flow rate calculation part C5, a flow rate correction part C6, a display control part C7, and the like by causing the CPU to execute a program stored in the memory. In addition, the display part is, for example, a display or the like.

The valve control part C1 is one that controls on/off of the first on-off valve V1, the second on-off valve V2, and the third on-off valve V3. Specifically, upon receipt of a flow rate calculation start signal, the valve control part C1 sequentially transmits the switching signals for switching to the exhaust mode, to the preparation mode, to the inflow mode, and to the stop mode to the respective on-off valves V1 to V3 in this order.

The pressure change data storage part C2 is one that stores pressure change data indicating a temporal change in pressure detected by the pressure sensor P. Specifically, the pressure change data storage part C2 is one that stores pressure change data indicating a temporal change in pressure detected by the pressure sensor P at least during an inflow period (see FIG. 4) from switching to the inflow mode to switching to the stop mode. More specifically, the pressure change data storage part C2 only has to be one that stores pressure change data related to at least a period from switching to the inflow mode to after the rate of change (the rate of rise) in the pressure inside the tank 10 is stabilized during the inflow period. In addition, the pressure change data storage part C2 in the present embodiment is adapted to store pressure change data related to a period that is the sum of the inflow period and a waiting period (see FIG. 4) from switching to the stop mode until a predetermined time elapses with the stop mode kept.

The temperature change data storage part C3 is one that stores temperature change data indicating a temporal change in temperature detected by the temperature sensor T. Specifically, the temperature change data storage part C3 is one that stores temperature change data indicating a temporal change in temperature detected by the temperature sensor T at least during the inflow period. Also, the temperature change data storage part C3 may be one that stores temperature change data during a part of the inflow period as with the pressure change data storage part C2.

In addition, the pressure change data storage part C2 may be adapted to store pressure change data related to the entire period during which the flow rate calculation system 100 operates, or may be adapted to store pressure change data related to a necessary period with reference to the switching signals transmitted from the valve control part C1 to the respective on-off valves V1 to V3. The same applies to the temperature change data storage part C3.

The average temperature calculation part C4 calculates the average temperature of the tank 10 during the inflow period. Specifically, the average temperature calculation part C4 calculates the average temperature on the basis of the temperature change data related to the inflow period and stored in the temperature change data storage part C3.

The flow rate calculation part C5 is one that uses a theoretical formula to calculate the estimated flow rate of the fluid estimated to flow through the inflow line L1 during the inflow period. Specifically, the flow rate calculation part C5 calculates the estimated flow rate on the basis of the rate of change (the rate of rise) in pressure calculated from the pressure change data related to the inflow period and stored in the pressure change data storage part C2 and the average temperature calculated by the average temperature calculation part C4. More specifically, the flow rate calculation part C5 calculates the estimated flow rate by substituting the rate of change in pressure and the average temperature into Expression 1 above. In addition, the flow rate calculation part C5 calculates the rate of change in pressure per unit time with reference to pressures at multiple time points included in the pressure change data.

The estimated flow rate of the fluid estimated to flow through the inflow line L1 is controlled by the flow rate control device MFC. Therefore, it can also be said that the flow rate calculation part C5 calculates the estimated flow rate of the fluid estimated to flow through the flow rate control device MFC.

The flow rate correction part C6 corrects the estimated flow rate calculated by the flow rate calculation part C5. Specifically, the flow rate correction part C6 corrects the estimated flow rate on the basis of first pressure detected by the pressure sensor P after a predetermined time has elapsed since switching from the inflow mode to the stop mode and second pressure included in the pressure change data during the inflow period and higher than the first pressure. More specifically, the flow rate correction part C6 corrects the estimated flow rate on the basis of a correction factor that is the ratio of the first pressure to the second pressure. Further specifically, the flow rate correction part C6 is one that makes the correction by multiplying the estimated flow rate by the correction factor.

Figure 4:
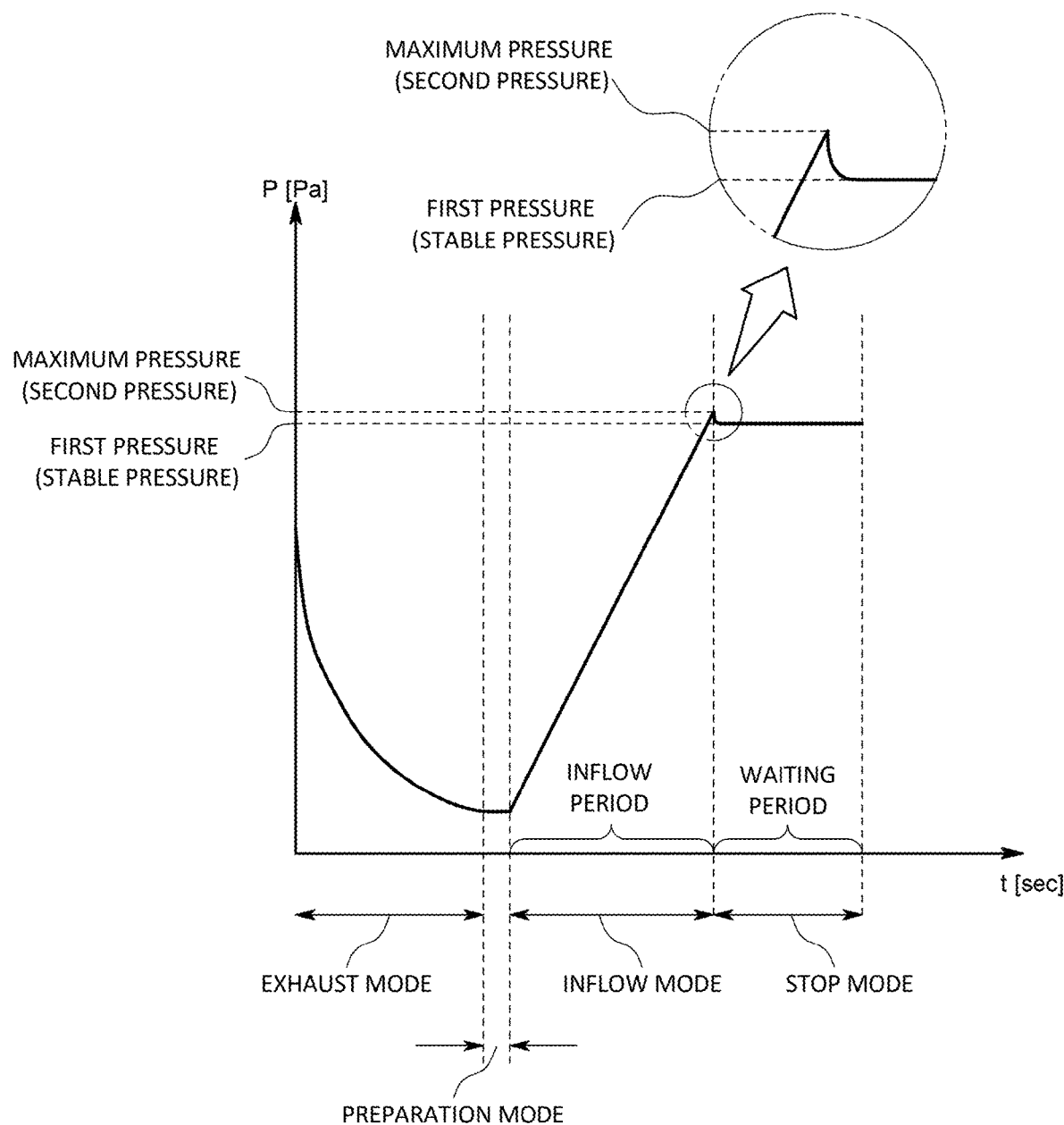
FIG. 4 is a graph illustrating a temporal change in pressure from switching the flow rate calculation system according to the embodiment to an exhaust mode to the elapse of a predetermined time after switching to a stop mode.

Here, the first pressure and the second pressure will be described in detail on the basis of FIG. 4. The pressure inside the tank 10 during the inflow period rises not only because of an increase in the amount of the fluid flowing in through the inflow line L1 but because of the effect of a temperature rise caused by adiabatic compression inside the tank 10. Accordingly, immediately after the end of the inflow period, the pressure sensor P detects pressure affected by the temperature rise caused by the adiabatic compression inside the tank 10. However, after the predetermined time has elapsed since the end of the inflow period, the pressure sensor P detects pressure (stable pressure) hardly affected by the temperature rise caused by the adiabatic compression inside the tank 10. This pressure is the first pressure.

Also, the predetermined time is selected within a range of a few minutes to a few hours. In addition, as time since the end of the inflow period is increased, the effect of the temperature rise caused by the adiabatic compression inside the tank 10 on pressure detected by the pressure sensor P also decreases. Accordingly, as the predetermined time is increased, the correction factor enabling the estimated flow rate to be corrected to a value closer to an actual flow rate is obtained.

Further, the second pressure is pressure higher than the first pressure among pressures detected by the pressure sensor P during the inflow period. In addition, the second pressure is preferably the maximum pressure or pressure close to the maximum pressure among the pressures detected by the pressure sensor during the inflow period. In the present embodiment, the maximum pressure among the pressures detected by the pressure sensor P during the inflow period is set as the second pressure.

Also, the display control part C7 is one that displays the corrected estimated flow rate calculated by the flow rate correction part C6 on the display part.

Next, the operation of the flow rate calculation system 100 will be described.

First, upon receipt of the flow rate calculation start signal, the valve control part C1 sequentially transmits the switching signals for switching to the exhaust mode, to the preparation mode, to the inflow mode, and to the stop mode to the respective on-off valves V1 to V3. This allows the respective valves V1 to V3 to sequentially switch to the respective modes (Steps S1, S2, S3, and S5).

In addition, when switching to the inflow mode, the pressure change data storage part C2 starts storing the pressure change data (Step 4). Then, after the predetermined time has elapsed with the stop mode kept since switching from the inflow mode to the stop mode, the pressure change data storage part C2 ends storing the pressure change data (Step S8). That is, the pressure change data storage part C2 stores the pressure change data related to the period that is the sum of the inflow period from switching to the inflow mode to switching to the stop mode and the waiting period from switching to the stop mode until the predetermined time elapses with the stop mode kept.

Also, when switching to the inflow mode, the temperature change data storage part C3 starts storing the temperature change data (Step S4). Then, when switching from the inflow mode to the stop mode, the temperature change data storage part C3 ends storing the temperature change data (Step S6). That is, the temperature change data storage part C3 stores the temperature change data related to the inflow period.

Then, the average temperature calculation part C4 calculates the average temperature of the tank 10 during the inflow period on the basis of the temperature change data stored in the temperature change data storage part C3 (Step S9).

Subsequently, the flow rate calculation part C5 calculates the rate of change in pressure during the inflow period on the basis of the pressure change data stored in the pressure change data storage part C2. Further, on the basis of the rate of change in pressure and the average temperature, the flow rate calculation part C5 calculates the estimated flow rate of the fluid estimated to flow through the inflow line L1 during the inflow period (Step S10). Specifically, the flow rate calculation part C5 substitutes the rate of change in pressure and the average temperature into Expression 1 above to calculate the estimated flow rate of the fluid estimated to flow through the inflow line L1 during the inflow period.

After that, the flow rate correction part C6 corrects the estimated flow rate calculated by the flow rate calculation part (Step S11). Specifically, the flow rate correction part C6 refers to pressure change data related to the waiting period to, as the first pressure, acquire the pressure after the predetermined time has elapsed since switching from the inflow mode to the stop mode. Also, the flow rate correction part C6 refers to the pressure change data related to the inflow period to, as the second pressure, acquire pressure higher than the first pressure. Specifically, the flow rate correction part C6 refers to pressure change data related to the inflow period to, as the second pressure, acquire the maximum pressure or pressure close to the maximum pressure during the inflow period. That is, as the second pressure, the flow rate correction part C6 acquires pressure at the time when switching from the inflow mode to the stop mode or pressure immediately before or after the time.

Then, the flow rate correction part C6 calculates the correction factor on the basis of the acquired first pressure and second pressure, and uses the correction factor to correct the estimated flow rate calculated by the flow rate calculation part C5. Specifically, the flow rate correction part C6 uses the ratio of the first pressure P1 to the second pressure P2, i.e., P1/P2 as the correction factor to make the correction by multiplying the estimated flow rate by the correction factor.

After that, the display control part C7 displays the corrected estimated flow rate corrected by the flow rate correction part C6 on the display part (Step S12).

Other Embodiments

Figure 5:
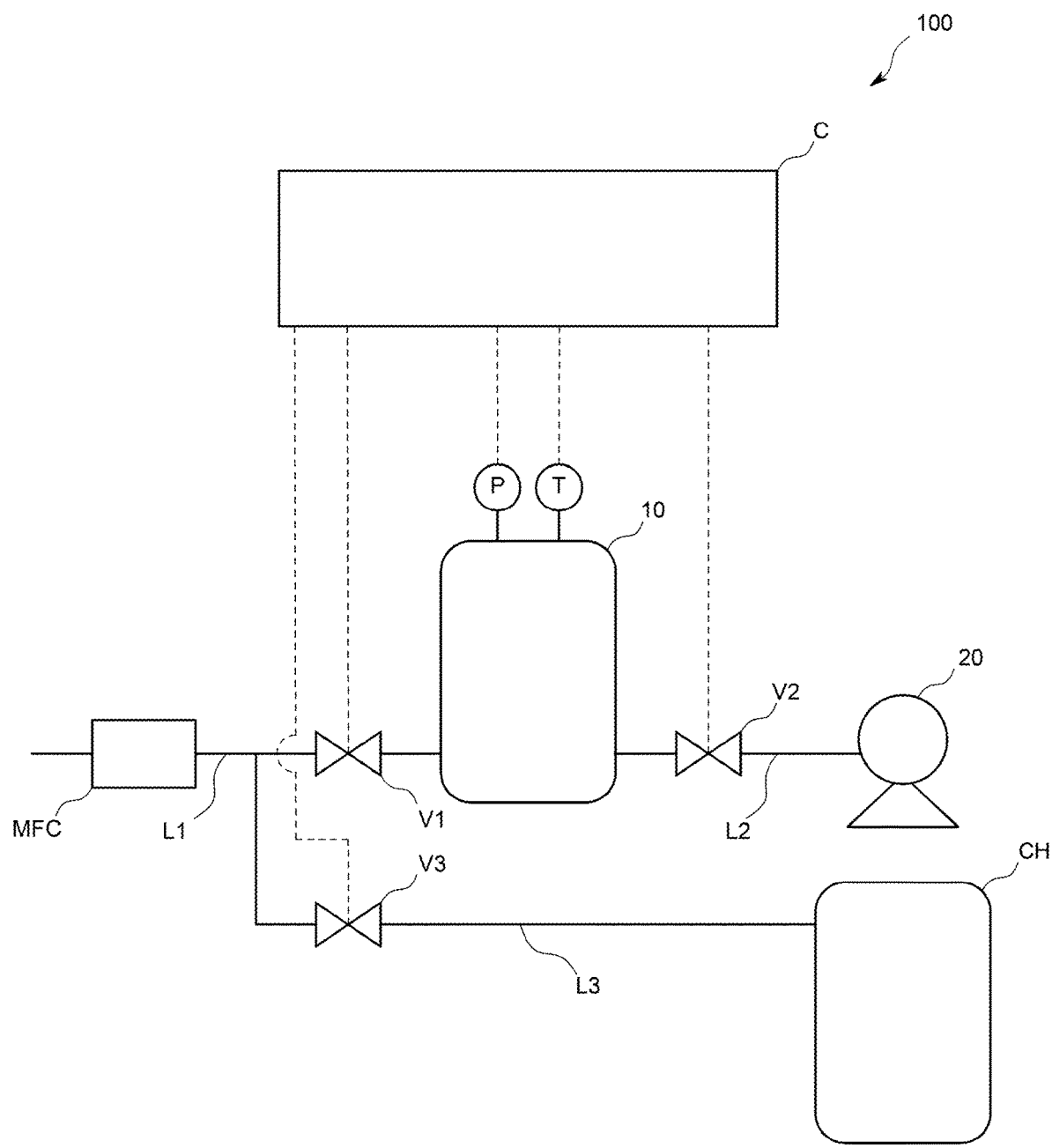
FIG. 5 is a schematic diagram illustrating a flow rate calculation system according to another embodiment.

In the flow rate calculation system 100 according to the above-described embodiment, the branch line L3 branching from the inflow line L1 is connected to the outflow line L2 so as to bypass the tank 10. However, as illustrated in FIG. 5, it may be possible to configure a fluid supply system in which the downstream side of the branch line L3 is connected to a chamber CH as a fluid supply target and the flow rate calculation system 100 is incorporated. The fluid supply system having such a configuration is capable of continuing to supply the fluid flowing through the inflow line L1 to the chamber CH during a period other than the inflow period. This makes it possible to shorten the time to stop supplying to the chamber CH when calculating the estimated flow rate.

Also, in the flow rate calculation system 100 according to the above-described embodiment, the flow rate calculation device C may be made to serve as a flow rate inspection device that fulfils a function as a flow rate comparison part in addition to the respective functions of the flow rate calculation device C. In this case, the flow rate comparison part only has to be configured to compare a set flow rate set in the flow rate control device MFC during the inflow period and the corrected estimated flow rate calculated by the flow rate correction part C6. Further, the flow rate calculation device C may be made to serve as a flow rate calibration device that fulfills functions as the flow rate comparison part and a calibration part in addition to the respective functions of the flow rate calculation device. In this case, the calibration part only has to be configured to calibrate the flow rate control device MFC on the basis of a result of comparison by the flow rate comparison part. In addition, the flow rate inspection device and the flow rate calibration device are computers having a CPU, a memory, an AD converter, a DC converter, input means, and the like as with the flow rate calculation device, and are ones that fulfill the respective functions by causing the CPU to execute a program stored in the memory.

Further, in the above-described embodiment, the pressure change data storage part C2 stores the pressure change data related to the inflow period and the waiting period, but is not limited to this. For example, the pressure change data storage part C2 may be adapted to store only the pressure change data related to the inflow period. In this case, the flow rate correction part C6 only has to be configured to acquire the pressure detected by the pressure sensor P after the predetermined time has elapsed since switching from the inflow mode to the stop mode, and set the acquired pressure as the first pressure. In addition, the pressure change data storage part C2 may be adapted to store pressure change data related to a period other than the inflow period and the waiting period.

Also, in the above-described embodiment, the flow rate correction part C6 corrects the estimated flow rate calculated by the flow rate calculation part C5 on the basis of the first pressure and the second pressure, but is not limited to this. For example, the flow rate correction part C6 may be one that corrects the estimated flow rate on the basis of first temperature detected by the temperature sensor T after a predetermined time has elapsed since the first on-off valve V1 was closed and second temperature included in the temperature change data and higher than the first temperature.

Besides, it goes without saying that the present invention is not limited to each of the above-described embodiments but can be variously modified without departing from the scope thereof.

LIST OF REFERENCE CHARACTERS

100: Flow rate calculation system
10: Tank
20: Pump
L1: Inflow line
L2: Outflow line
L3: Branch line
V1: First on-off valve
V2: Second on-off valve
V3: Third on-off valve
P: Pressure sensor
T: Temperature sensor
C: Flow rate calculation device
C1: Valve control part
C2: Pressure change data storage part
C3: Temperature change data storage part
C4: Average temperature calculation part
C5: Flow rate calculation part
C6: Flow rate correction part
C7: Display control part
MFC: Flow rate control device

The invention claimed is:

1. A flow rate calculation system including a tank into which fluid flows, an inflow line through which the fluid flows into the tank, and a pressure sensor that detects pressure inside the tank, the flow rate calculation system further comprising:
 a pressure change data storage part that stores pressure change data indicating a temporal change in the pressure detected by the pressure sensor during an inflow period from start flowing the fluid into the tank through the inflow line to stop flowing the fluid into the tank;
 a flow rate calculation part that, on a basis of a pressure change rate calculated from the pressure change data, calculates an estimated flow rate of the fluid estimated to flow through the inflow line during the inflow period; and
 a flow rate correction part that, on a basis of first pressure detected by the pressure sensor after a predetermined time has elapsed since stop flowing the fluid into the tank and second pressure included in the pressure change data and higher than the first pressure, corrects the estimated flow rate calculated by the flow rate calculation part.

2. The flow rate calculation system according to claim 1, wherein the second pressure is maximum pressure included in the pressure change data or pressure close to the maximum pressure.

3. The flow rate calculation system according to claim 1, wherein
the flow rate correction part corrects the estimated flow rate on a basis of a correction factor that is a ratio of the first pressure to the second pressure.

4. The flow rate calculation system according to claim 1, further comprising
a temperature sensor that detects temperature inside or of the tank, wherein
the flow rate calculation part calculates the estimated flow rate on a basis of the pressure change rate and temperature detected by the temperature sensor during the inflow period.

5. The flow rate calculation system according to claim 4, further comprising:
a temperature storage part that stores temperature change data indicating a temporal change in the temperature detected by the temperature sensor during the inflow period; and
an average temperature calculation part that, from the temperature change data, calculates average temperature inside or of the tank during the inflow period, wherein
the flow rate calculation part calculates the estimated flow rate on a basis of the pressure change rate and the average temperature.

6. The flow rate calculation system according to claim 4, wherein
the temperature sensor detects wall temperature of the tank.

7. The flow rate calculation system according to claim 1, further comprising
a flow rate control device that controls a flow rate of the fluid flowing through the inflow line, wherein
the flow rate calculation part calculates the estimated flow rate of the fluid estimated to flow through the flow rate control device during the inflow period.

8. The flow rate calculation system according to claim 7, further comprising:
a branch line that branches from the inflow line; and
a switching mechanism that switches between a first state allowing the fluid to flow only to the branch line and a second state allowing the fluid to flow only to a downstream side of a branching point to the branch line in the inflow line, wherein
the flow rate control device is provided on an upstream side of the branching point to the branch line in the inflow line.

9. A recording medium recording a flow rate calculation system program used for a flow rate calculation system including a tank into which fluid flows, an inflow line through which the fluid flows into the tank, and a pressure sensor that detects pressure inside the tank, the flow rate calculation system program fulfilling functions as:
a pressure change data storage part that stores pressure change data indicating a temporal change in the pressure detected by the pressure sensor during an inflow period from start flowing the fluid into the tank through the inflow line to stop flowing the fluid into the tank;
a flow rate calculation part that, on a basis of a pressure change rate calculated from the pressure change data, calculates an estimated flow rate of the fluid estimated to flow through the inflow line during the inflow period; and
a flow rate correction part that, on a basis of first pressure detected by the pressure sensor after a predetermined time has elapsed since stop flowing the fluid into the tank and second pressure included in the pressure change data and higher than the first pressure, corrects the estimated flow rate calculated by the flow rate calculation part.

10. A flow rate calculation method used for a flow rate calculation system including a tank into which fluid flows, an inflow line through which the fluid flows into the tank, and a pressure sensor that detects pressure inside the tank, the flow rate calculation method comprising the steps of:
storing pressure change data indicating a temporal change in the pressure detected by the pressure sensor during an inflow period from start flowing the fluid into the tank through the inflow line to stop flowing the fluid into the tank;
on a basis of a pressure change rate calculated from the pressure change data, calculating an estimated flow rate of the fluid estimated to flow through the inflow line during the inflow period; and
on a basis of first pressure detected by the pressure sensor after a predetermined time has elapsed since stop flowing the fluid into the tank and second pressure included in the pressure change data and higher than the first pressure, correcting the estimated flow rate calculated by the flow rate calculation part.

11. A flow rate calculation device used for a flow rate calculation system including a tank into which fluid flows, an inflow line through which the fluid flows into the tank, and a pressure sensor that detects pressure inside the tank, the flow rate calculation device comprising:
a pressure change data storage part that stores pressure change data indicating a temporal change in the pressure detected by the pressure sensor during an inflow period from start flowing the fluid into the tank through the inflow line to stop flowing the fluid into the tank;
a flow rate calculation part that, on a basis of a pressure change rate calculated from the pressure change data, calculates an estimated flow rate of the fluid estimated to flow through the inflow line during the inflow period; and
a flow rate correction part that, on a basis of first pressure detected by the pressure sensor after a predetermined time has elapsed since stop flowing the fluid into the tank and second pressure included in the pressure change data and higher than the first pressure, corrects the estimated flow rate calculated by the flow rate calculation part.

12. A flow rate calculation system including a tank into which fluid flows, an inflow line through which the fluid flows into the tank, a pressure sensor that detects pressure inside the tank, and a temperature sensor that detects temperature inside or of the tank, the flow rate calculation system further comprising:
a pressure change data storage part that stores pressure change data indicating a temporal change in the pressure detected by the pressure sensor during an inflow period from start flowing the fluid into the tank through the inflow line to stop flowing the fluid into the tank;
a temperature change data storage part that stores temperature change data indicating a temporal change in the temperature detected by the temperature sensor during the inflow period;
a flow rate calculation part that, on a basis of a pressure change rate calculated from the pressure change data, calculates an estimated flow rate of the fluid estimated to flow through the inflow line during the inflow period; and a flow rate correction part that, on a basis of first temperature detected by the temperature sensor after a predetermined time has elapsed since closing a first on-off valve and second temperature included in the temperature change data and higher than the first temperature, corrects the estimated flow rate calculated by the flow rate calculation part.

\* \* \* \* \*